(12) United States Patent  (10) Patent No.: US 8,189,009 B1
Brown et al.  (45) Date of Patent: May 29, 2012

(54) INDEXED ACCESS TO TEXTURE BUFFER OBJECTS USING A GRAPHICS LIBRARY

(75) Inventors: Patrick R. Brown, Raleigh, NC (US); Jeffrey A. Bolz, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 1540 days.

(21) Appl. No.: 11/609,859

(22) Filed: Dec. 12, 2006

Related U.S. Application Data

(60) Provisional application No. 60/833,978, filed on Jul. 28, 2006.

(51) Int. Cl.
G09G 5/00 (2006.01)
G06T 15/50 (2011.01)
G06T 15/60 (2006.01)

(52) U.S. Cl. .................. 345/582; 345/426

(58) Field of Classification Search .......... 345/506, 345/582, 426
See application file for complete search history.

(56) References Cited

U.S. PATENT DOCUMENTS

| | | | |
|---|---|---|---|
| 5,005,137 A | 4/1991 | Ernst | |
| 5,812,854 A | 9/1998 | Steinmetz et al. | |
| 5,870,097 A | 2/1999 | Snyder et al. | |
| 5,877,779 A * | 3/1999 | Goldberg et al. | 345/538 |
| 5,977,977 A | 11/1999 | Kajiya et al. | |
| 6,044,225 A | 3/2000 | Spencer et al. | |
| 6,046,747 A * | 4/2000 | Saunders et al. | 345/582 |
| 6,828,980 B1 * | 12/2004 | Moreton et al. | 345/582 |
| 6,891,544 B2 | 5/2005 | Oka et al. | |
| 6,982,718 B2 | 1/2006 | Kilgard et al. | |
| 6,983,456 B2 | 1/2006 | Poznanovic et al. | |
| 7,006,101 B1 | 2/2006 | Brown et al. | |
| 7,009,615 B1 | 3/2006 | Kilgard et al. | |
| 7,015,915 B1 | 3/2006 | Diard | |
| 7,593,971 B1 * | 9/2009 | Nordquist | 1/1 |
| 2003/0020741 A1 | 1/2003 | Boland et al. | |
| 2004/0012596 A1 | 1/2004 | Allen et al. | |
| 2004/0158693 A1 | 8/2004 | Dagan et al. | |
| 2004/0169671 A1 | 9/2004 | Aronson et al. | |
| 2005/0190195 A1 * | 9/2005 | Lindholm et al. | 345/582 |
| 2005/0243094 A1 | 11/2005 | Patel et al. | |
| 2005/0259104 A1 * | 11/2005 | Koguchi | 345/552 |
| 2006/0114260 A1 | 6/2006 | Diard | |

OTHER PUBLICATIONS

Office Action. U.S. Appl. No. 11/565,566 dated Jun. 9, 2009.

* cited by examiner

Primary Examiner — Jacinta M Crawford
(74) Attorney, Agent, or Firm — Patterson & Sheridan, LLP.

(57) ABSTRACT

A method for generating a texture buffer object configured for storing and manipulating texture data for graphics processing operations includes the steps of creating a buffer object configured to store the texture data, binding the buffer object to a texture buffer object, binding the texture buffer object to one of a plurality of texture targets included within a texture image unit, and binding a shader program to a processing unit within a graphics rendering pipeline. One advantage of the disclosed method is that, once a texture buffer object is bound as the target of a texture image unit, shader programs may read and/or write to the buffer object referenced by the texture buffer object, without having to rebind that texture buffer object.

17 Claims, 4 Drawing Sheets

INDEXED ACCESS TO TEXTURE BUFFER OBJECTS USING A GRAPHICS LIBRARY

CROSS REFERENCE TO RELATED APPLICATIONS

This application claims priority to the U.S. Provisional Application titled: "API Extensions for Advanced Graphics Processing Units," filed on Jul. 28, 2006 and having U.S. patent application No. 60/833,978.

BACKGROUND OF THE INVENTION

1. Field of the Invention

Embodiments of the present invention generally relate to computer programming for graphics processing systems. More specifically, embodiments of the invention relate to techniques for accessing a texture buffer object using a graphics library.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, a GPU may include multiple texture image units used to store references to texture maps used in graphics rendering operations. One benefit of this new capability is that more efficient texture mapping operations and the like may now be performed on the GPU, thereby increasing overall performance in the graphics pipeline.

To fully realize additional processing capabilities of advanced GPUs, as much GPU functionality as possible needs to be exposed to graphics application developers. Among other things, doing so enables graphics application developers to tailor their shader programs to optimize the way GPUs process graphics scenes and images. Exposing new GPU processing capabilities to graphics application developers requires that the application programming interface (API) be configured with new calls and libraries that make new features and functionalities directly accessible by developers.

Graphics APIs typically expose an interface to graphics application developers that enables an application executing on the host CPU to load image data, in the form of one or more texture maps, into GPU local memory for greater access and processing efficiency by the GPU. Texture map data is commonly represented as one or more intensity values per texture element, called a "texel." For example, a texel may include a single intensity value per texel. Alternately, a texel may include four values, corresponding to red, green and blue intensity, and opacity. Each value within a texel is commonly represented using either a floating-point value, such as a standard 32-bit floating-point number, or a fixed-point normalized value. For example, an 8-bit normalized value includes 256 codes, ranging from 0x00 to 0xFF, where 0x00 corresponds to a floating-point value of "0.0" and 0xFF corresponds to a floating-point value of "1.0." Each incremental code between 0x00 and 0xFF corresponds to 255 increasing floating-point values.

Some prior art graphics APIs provide a set of specific calls used to load and access data from a texture map. Typically, API calls may be used to load a texture map into local memory that is then accessed by a shader engine during rendering operations. In some cases, before the shader engine, which executes the instructions of a shader program, accesses a texture map, the texture map needs to be set to an "active" state for the rendering pipeline. The graphics hardware typically allows a developer to specify an active set of texture maps to use in rendering operations. However, if the developer changes shader programs, then the set of active texture maps may need to be specified again, even if intervening shader programs do not use a texture of that type. Similarly, if a developer desires to use different texture maps for the same shader program, than the developer may have to set an active map each time a different texture map is needed.

Moreover, to even provide this functionality may require multiple data copies to load data into the GPU. Data output from a graphics rendering pipeline is copied into a frame buffer, and then this data is copied from the frame buffer to other portions of memory. Depending on the configuration of a particular graphics hardware device, the process may require the data to also be copied to memory managed by the CPU and then passed back to the local memory of the graphics hardware.

Additionally, conventional textures are accessed by floating-point texture coordinates and are "typed" with a texel format that must be followed whenever the texture is accessed. For a one-dimensional (1D) array of textures, this approach fails to accurately represent the texture map as a set of individual, discrete texels. This formatting requirement limits the amount of memory available for a texture. For example, using 32-bit floating-point texture coordinates would limit conventional 1D textures to an image size of roughly $2^{24}$ pixels. Linear filtering makes the maximum practical size with the prior art even smaller. Filtering allows a weighted average between two neighboring texels to be determined, using the floating-point coordinate to generate a filtering weight. However, the larger an image, the less precision available for weights. For example, if an image had $2^{24}$ texels, each texel may be represented directly, but the 32-bit floating-point coordinates would leave no bits for weights. For example, there is no 32-bit floating point number between $2^{24}-1$ and $2^{24}-2$.

As the foregoing illustrates, what is needed in the art is a mechanism to specify and access texture maps that provides greater efficiency and flexibility than prior art techniques.

SUMMARY OF THE INVENTION

Embodiments of the invention provide for indexed access to texture buffer objects using a graphics library. An existing buffer object may be loaded using a transform feedback or some other mechanism and use data in the buffer object directly (e.g., as a texture in the shader), without requiring multiple copies of the data from a frame buffer, or coping data back to system memory managed by a CPU. One embodiment of the present invention sets forth a method for generating a texture buffer object configured for storing and manipulating texture data for graphics processing operations. The method includes the steps of creating a buffer object configured to store the texture data, binding the buffer object to a texture buffer object, binding the texture buffer object to one of a plurality of texture targets included within a texture image unit, and binding a shader program to a processing unit within a graphics rendering pipeline.

One advantage of the disclosed method is that, once a texture buffer object is bound as the target of a texture image unit, shader programs may read and/or write to the buffer object referenced by the texture buffer object, without having to rebind that texture buffer object each time different shader program is loaded. Further, multiple texture image units may be provided and used simultaneously without needless or redundant data copies or the overhead of setting an active texture buffer object each time a different one is to be accessed. For example, if an application is going to use buffer object A with program B and also use buffer object C with program D, the application could bind the texture buffer object using A to image unit #0 and the texture buffer object using C to image unit #1. Program B would refer to unit 0; program D would refer to unit 1.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. Note, however, that the appended drawings illustrate only typical embodiments of this invention and are therefore not to be considered limiting of its scope, for the invention may admit to other equally effective embodiments.

DETAILED DESCRIPTION

Figure 1:
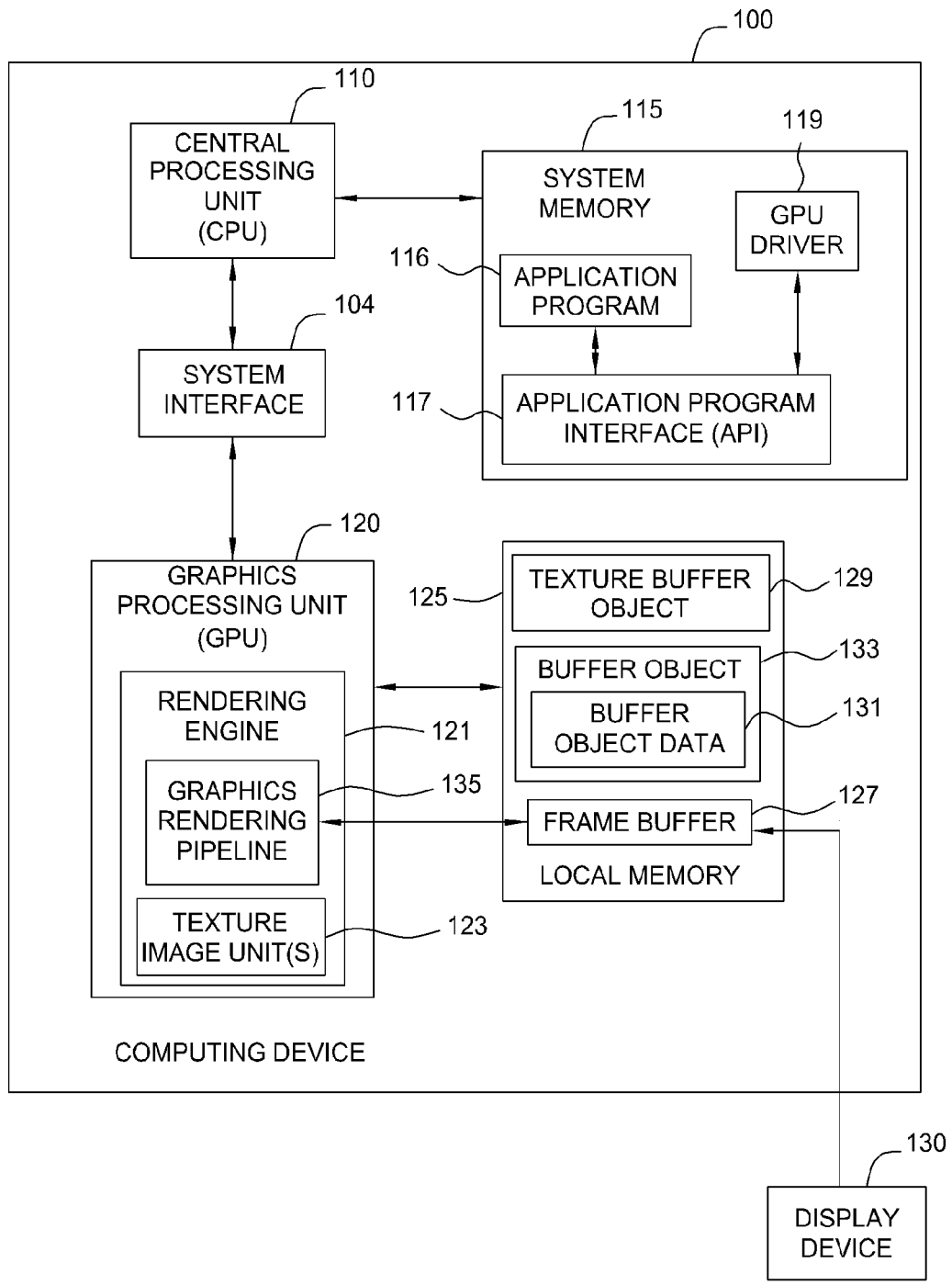
FIG. 1 is a conceptual diagram of a computing device configured to implement one or more aspects of the present invention.

Embodiments of the invention allow developers of graphics applications to efficiently and effectively manipulate a memory buffer object as a texture map using a graphics library. As described herein, the term "texture map" broadly refers to texture data that is organized as an array of pixels or texels. "Pixels" is usually used when discussing texture image data that is a source image or other data transmitted from an application program or when the texture image data is stored a frame buffer memory local to graphics processing hardware, and "texels" is usually used when discussing texture image data that is stored in a texture memory local to the graphics processing hardware. The words pixel and texel may be used interchangeably throughout the present application, depending on context, and neither word is intended to limit the scope of the present invention. Texture image data may include conventional image data, such as color components, or may include other types of data also suitable for use as a texture map, e.g., light intensity, height fields, displacement data, and the like. Each pixel or texel making up the texture data may include one or more components.

Generally, embodiments of the invention provide a texture buffer object that may reference data stored in a buffer object as a texture map. A buffer object may be allocated from memory local to graphics processing hardware. Once allocated, an API call may be used to define a reference to the buffer object, referred to as a texture buffer object. The API call may also specify a texture map format for accessing data in the buffer object as a one-dimensional (1D) array of texels. The size of the texture map may be determined from the size of the buffer object and the size of the elements for the specified internal format. For example, a 512 byte buffer object specified as "RGBA8," that is as texels having red, green, blue, and alpha components of 8 bits each, would include 128 discrete texels accessed as array elements [0.127]. Each texel would take 4 bytes (one each for R, G, B, A values), so 512 bytes would include memory for 128 texels.

Because a graphics API may allow a developer to manipulate the buffer object in a variety of ways, the flexibility of using a buffer object, formatted as a texture buffer object, is superior to using conventional texture maps in various situations. For example, a texel in the buffer object may be accessed using integer indexing, rather than having to determine an appropriate floating-point coordinate to access the texel. At the same time, the texture buffer object may be accessed as a texture map using the internal format specified for the buffer object during graphics rendering operations. The internal format allows the graphics API to decrease memory requirements needed to index a texture buffer object. For example, a conventional "RGBA8" format is intended to encode four floating-point values in the range [0.0.1.0] as integers in the range [0.255]. In such an encoding, a floating point value of 0.0 corresponds to an index value of 0, a floating point value of 0.5 corresponds to an index value of 128, and a floating point value of 1.0 corresponds to a index value of 255. When using this format with a buffer texture, the values returned would be floating-point values in the range [0.0,1.0]. So 32-bit floats per component may be represented, but doing so only requires 8 bits worth of memory bandwidth.

Further, in one embodiment, graphics processing hardware may include a set of texture image units. Each texture image unit may be used to specify a set of "active" texture objects of different targets, including one-, two-, and three-dimensional texture objects, cube map texture objects, and a new texture buffer object. Because the texture image data in a buffer object is separate from the reference provided by the texture buffer object, this data may be modified without having to "rewire" which active texture buffer object is referenced by a particular texture image unit. Additionally, by setting the texture buffer object for multiple texture image units, different texture buffer objects may be used simultaneously without having to rebind a new texture buffer object to a texture image unit each time a different one is needed for rendering operations. Similarly, different texture buffer objects may be used without requiring a developer to change the "active" texture buffer object during rendering operations each time a different one is needed.

FIG. 1 is a conceptual diagram of a computing device configured to implement one or more aspects of the present invention. As shown, computing device 100 includes, without limitation, a central processing unit (CPU) 110 connected to a system memory 115, a system interface 104, a graphics processing unit (GPU) 120, and a local memory 125 coupled to both GPU 120 and a display device 130. GPU 120 includes at least one rendering engine 121 that incorporates at least one graphics rendering pipeline 135 and one or more texture image units 123 used to process graphics data. System memory 115 includes a GPU driver 119 and an application program interface (API) 117. Generally, GPU driver 119 implements the functions and data structures exposed by API 117 for a given GPU 120.

The system memory 115 also includes an application program 116. The application program 116 generates calls to the API 117 in order to produce a desired set of results, typically in the form of a sequence of graphics images. The application program 116 also transmits one or more high-level shading programs or assembly-level shading programs and texture image data to the API 117 for processing within GPU driver 119. The high-level shading programs are typically source code text of high-level programming instructions that are designed to operate on one or more processing units within the GPU 120.

Local memory 125 stores, among other things, a frame buffer 127, a texture buffer object 129, and buffer object data 131. In one embodiment, data output from the graphics rendering pipeline 135 may be stored in a frame buffer 127. When graphics rendering pipeline 135 completes rendering a display frame, the contents of frame buffer 127 may be output to display device 130 for display. Typically, display device 130 is a CRT or LCD display. However, the output of rendering operations may not be used for immediate display, such as is the case when graphics rendering pipeline 135 is used to generate frames for an animation sequence or rendered visual effect. As described in detail herein, texture buffer object 129 includes a reference to buffer object 133 which contains buffer object data 131. In one embodiment, texture buffer object 129 may also specify an internal format specifying how buffer object data 131 in buffer object 133 should be interpreted when accessed as a texture map.

Persons skilled in the art will recognize that any system having one or more processing units configured to implement the teachings disclosed herein falls within the scope of the present invention. For example, computing device 100 may be, without limitation, a desk-top computer, a laptop computer, a mobile telephone, a set-top box or a personal digital assistant. CPU 102 generally executes programming instructions stored in the system memory 110, operates on data stored in system memory 110 and communicates with GPU 120 through system interface 104, which bridges communication between the CPU 110 and GPU 120. In alternate embodiments, the CPU 110, GPU120, system interface 104, or any combination thereof, may be integrated into a single processing unit. Further, the functionality of GPU 120 may be included in a chipset or in some other type of special purpose processing unit or co-processor.

Figure 2:
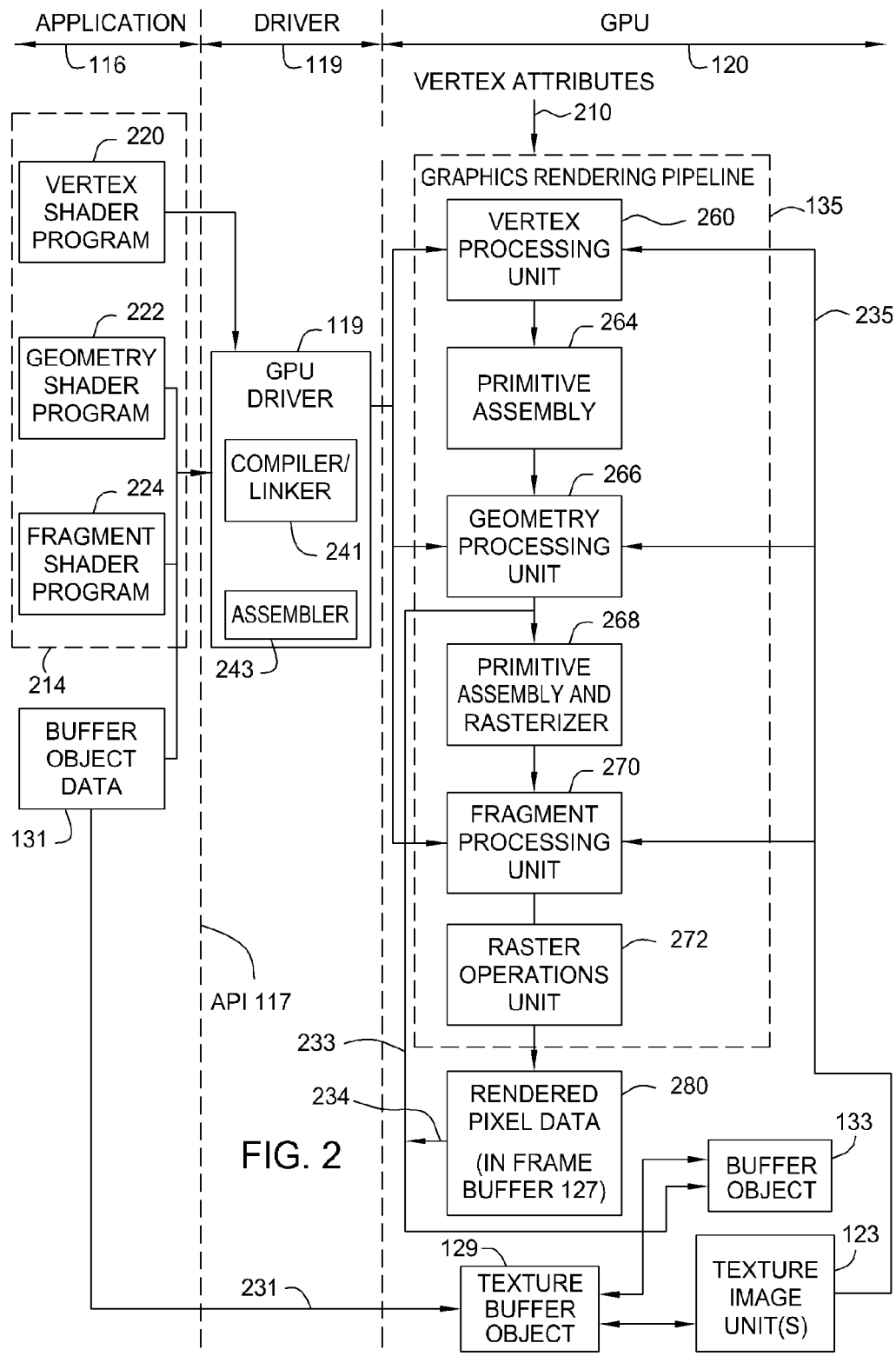
FIG. 2 is a conceptual illustration showing a graphics rendering pipeline in which a texture buffer object may be created and then accessed as a texture during graphics rendering operations, according to one embodiment of the invention.

FIG. 2 is a conceptual illustration showing a graphics rendering pipeline 135 in which texture buffer object 129 may be created and accessed as a texture map during graphics rendering operations, according to one embodiment of the invention. Also illustrated are components of application 116, GPU driver 119, and GPU 120. As shown, graphics rendering pipeline 135 includes a vertex processing unit 260, a geometry processing unit 266, a fragment processing unit 270, and a raster operations unit 272. When used to process graphics data to generate display images, vertex attributes 210 flow into the top of the graphics rendering pipeline 135, are processed by the vertex processing unit 260, the geometry processing unit 266, the fragment processing unit 270 and the raster operations unit 272. Generally, the output of graphics rendering pipeline 135 includes a set of rendered pixel data 280 stored in frame buffer 127 specifying color and intensity values for the different pixel positions within a display image.

Between vertex processing unit 260, geometry processing unit 266 and fragment processing unit 270 are primitive assembly unit 264 and primitive assembly and rasterizer unit 268. The primitive assembly unit 264 is typically a fixed-function unit that receives processed vertex data from vertex processing unit 260 and constructs graphics primitives, e.g., points, lines, triangles, or the like, for processing by geometry processing unit 266. Primitive assembly and rasterizer unit 268, which is optional in various implementations, receives the graphics primitives output by geometry processing unit 266, such as a set of triangles, and perform clipping operations to limit the triangles passed to fragment processing unit 270 to ones that might be viewable on display device 130. The rasterizer receives individual points, lines, or triangles processed by a primitive assembler and converts them to fragments to be processed by the fragment processing unit 270. During rendering operations, the processing units of graphics rendering pipeline 135 may access texel data from a texture buffer object 129, shown in FIG. 2 by an arrow 235.

The processing performed by vertex processing unit 260, geometry processing unit 266, and fragment processing unit may be defined by shader programs 214. Illustratively, FIG. 2 shows a vertex shader program 220, a geometry shader program 222, and a fragment shader program 224. In one embodiment, these shader programs may be written using a high-level shading language, such as the Cg or HLSL shader languages, and transmitted to API 117 for processing within GPU driver 119. The shader programs are then compiled and linked by a compiler/linker 241 included with GPU driver 119 to produce an assembly code version of the shader programs. The assembly code is then converted into machine code (also referred to as "microcode") by an assembler 243 also included in GPU driver 119. Optionally, compiler/linker 241 may directly produce machine code, in which case GPU driver 119 may not include assembler 243. The machine code versions of the shader programs are then transmitted to the vertex processing unit 260, the geometry processing unit 266 and the fragment processing unit 270, as the case may be, for execution. In alternative embodiments, the vertex shader program 220, the geometry shader program 222 and the fragment shader program 224 may be written in assembly code or may be compiled into assembly code externally to GPU driver 119. In such embodiments, GPU driver 119 would not necessarily include compiler/linker 241, and GPU driver 119 would receive assembly code versions of the shader programs directly. Assembler 243 would then convert the assembly code into machine code and transmit the machine code versions of the shader programs to the appropriate processing units of the graphics rendering pipeline 135, as set forth above.

Application 116 may supply buffer object data 131 to GPU driver 119 using calls to graphics API 117. GPU driver 119 may cause this data to be loaded into buffer object 130. Graphics processing units 260, 266, and 272 may access the texture buffer object 129 bound to one of texture image units 123 during rendering operations using various texel fetch operations. Once loaded, texture buffer object 129 may reference the buffer object 133 using an internal format specifying how to interpret texture image data 218 as a texture map. Texture image unit 123 may include references to one or more texture targets, including a reference to a texture buffer object. In one embodiment, the texture targets of texture image units 123 may be stateful. That is, once a texture target is set for a given texture type in one of the texture image is set, that target remains set until expressly changed. Thus, different shader programs 214 may access the same texture target, without having to bind to a desired texture target individually or having to repeatedly set an active texture. API 117 may include calls used to write data generated by one of the processing units of the graphics rendering pipeline 135 into buffer object 133 (represented in FIG. 2 using arrows 233 and 234). Arrow 233 represents transformed vertices being recorded into buffer object 133, and arrow 234 represents contents of the frame buffer being read directly into buffer object 133, without first being copied to going to a host CPU.

API 117 may also include calls used to modify the data in buffer object 133. As stated, for example, application 116 may supply texture image data 218 to be stored in buffer object 133. API 117 may also provide calls for writing data to buffer object 133, including buffer objects referenced by texture buffer object 129. For example, API 117 may provide an API call that allows a developer to map the buffer object 133 to a pointer used by application 116, allowing application 116 to write to buffer object 133 directly.

Figure 3:
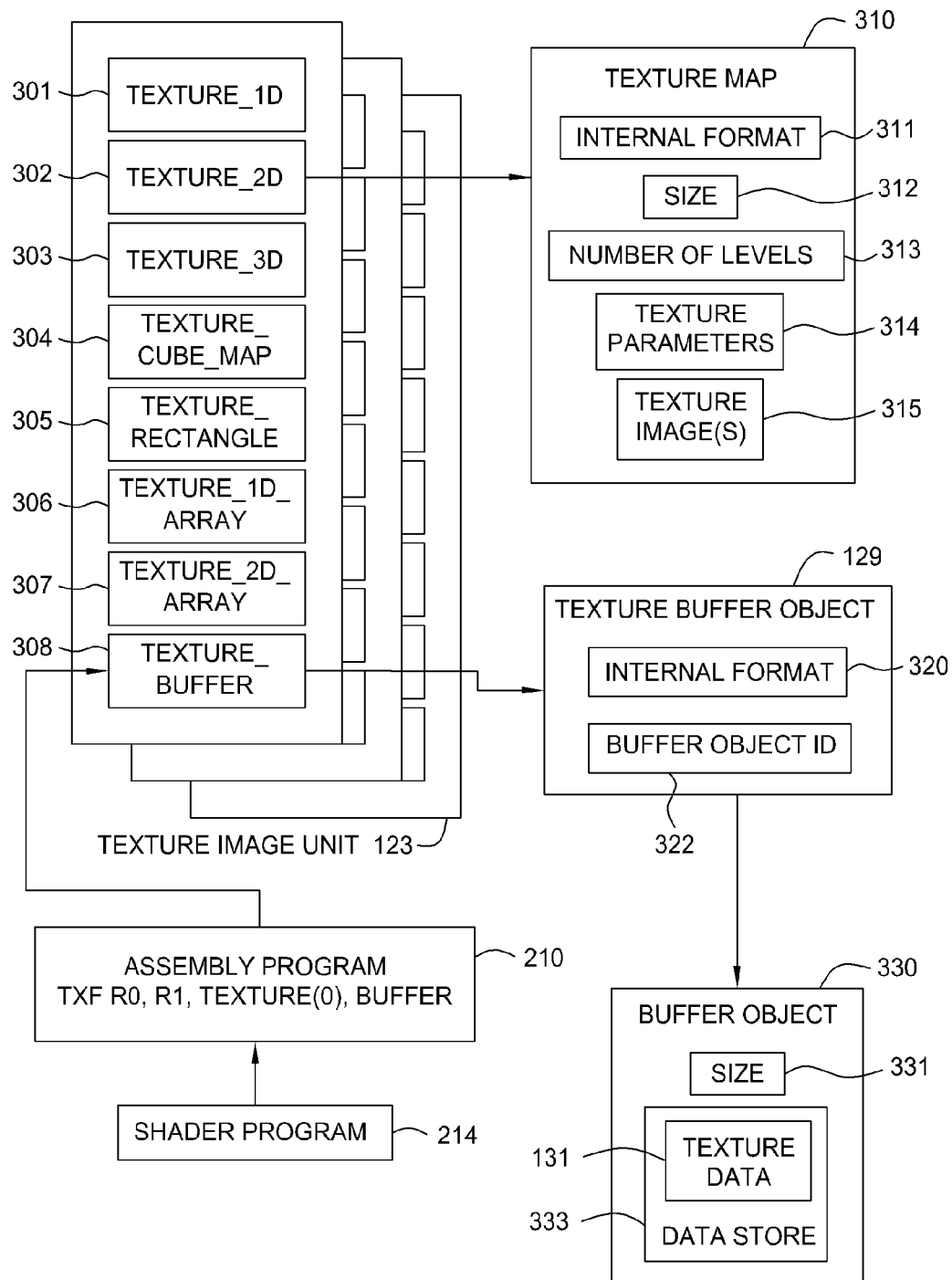
FIG. 3, is a conceptual diagram illustrating the relationships between a texture image unit, a texture buffer object, and a conventional texture map, according to one embodiment of the invention

FIG. 3, is a conceptual diagram illustrating relationships between a texture image unit 123, texture buffer object 129 referencing a buffer object 330, and a conventional texture map 310, according to one embodiment of the invention. As shown, each texture image unit 123 includes an array of texture targets. Each texture target is a reference to a different type of texture map. In this case, texture image unit 123, includes targets for a 1D texture 301, a two-dimensional (2D) texture 302, a three-dimensional texture (3D) 303, a cube map texture 304, a rectangle texture 305, an array of 1D textures 306, an array of 2D textures 307, and a texture buffer 308. However, the particular collection of texture targets that may be wired to one of texture image units 123 may vary from one graphics hardware device to another, and no particular collection is required to practice embodiments of the present invention. Further, as stated above, the texture targets of a texture image unit may be stateful, and once particular texture type is bound to one of texture image units 123, the binding remains until expressly removed or replaced.

Illustratively, 2D texture target 302 references texture map 310, which includes an internal format 311, a size 312, a number of mipmap levels 313 and texture parameters 314. Examples of parameters 314 include controls for mipmapping, wrapping, border colors, among others. Additionally, the texture map 315 includes one or more texture images 315. These elements are known components of a conventional texture map. Texture buffer target 308 references texture buffer object 129, which includes an internal format 320 and a buffer object ID 322. However, in contrast to texture map 310, texture buffer object 129 does not include the texture image data to use in rendering operations. Specifically, texture buffer object 129 does not include texture images 315. Instead, texture buffer object 129 includes internal format 320 specifying a format to use interpreting data stored a buffer object 330 as a 1D array of texels. As shown, buffer object 330 includes a size 331 and a data store 333. Data store 333 stores the texture data 131 (e.g., the texture image data 218 supplied by an application program 116) to be interpreted as a texture map according to internal format 320.

Although texture buffer object 129 does not directly store texture image data, it may be accessed in the same manner as a 1D array of texels. Thus, shader program 214 may include commands to fetch texels from texture buffer object 129 as though it were a texture. For example, FIG. 3 shows a command 343 of an assembly program used to access texture data from texture buffer object 129. Illustratively, the TXF instruction (short for texel fetch) includes the parameters of R0, R1, TEXTURE(0) and BUFFER. In this example, the "TEXTURE(0)" parameter identifies which one of texture image units 123 to access, and the "BUFFER" parameter identifies which target of that texture image unit to access. In this case, the "BUFFER" parameter specifies to access the buffer texture object 129 reference by texture buffer target 308. The R0 and R1 parameters specify registers on GPU 119. In this example, the R1 register may store an index value specifying which array location to access from the texture specified by the "TEXTURE(0)" and "BUFFER" parameters, and the R0 register may specify a destination to store the texel data retrieved from this array location. When executed, the TXF instruction causes the GPU 120 to identify the buffer texture target 308 bound to image unit 123 (in this case buffer texture object 129). Because the texture target does not store the texture image data directly, GPU 120 then identifies the buffer object referenced by buffer texture object 129 using buffer object ID 322. In turn, GPU 120 accesses buffer object 330 as a texture, according to the internal format 320 specified by the buffer texture object 129.

Figure 4:
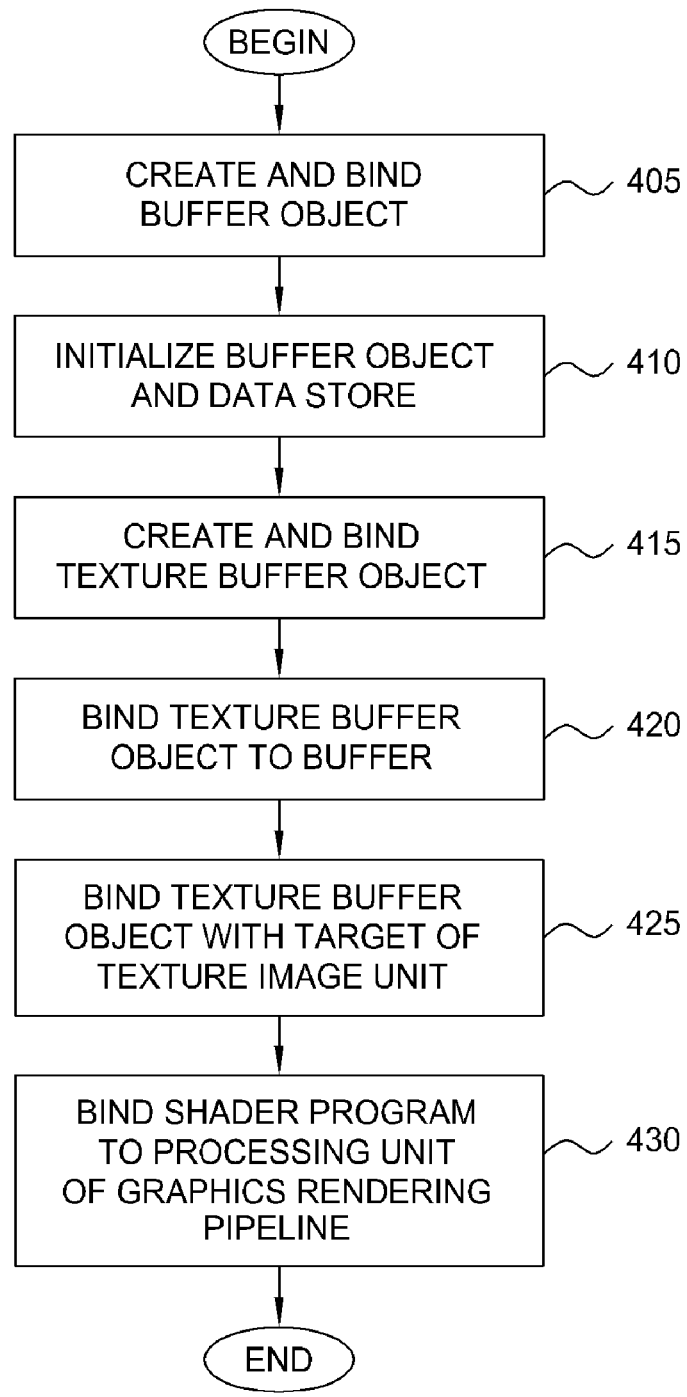
FIG. 4 illustrates is a method for specifying, loading and accessing a texture buffer object using a graphics library, according to one embodiment of the invention.

FIG. 4 illustrates a method 400 for specifying, loading and accessing a texture buffer object using a graphics library, according to one embodiment of the invention. Persons skilled in the art will understand that, even though the method is described in conjunction with the systems of FIGS. 1-3, any system configured to perform the method steps, in any order, is within the scope of the present invention.

Additionally, the method 400 is described in conjunction with extensions to the OpenGL Shading Language (GLSL) and related API calls used for specifying and loading a texture buffer object using a graphics library. Persons skilled in the art will appreciate that the information in this section should be considered in conjunction with the current OpenGL 2.0 (TM) specification. Importantly, the extensions presented herein introduce API calls to the OpenGL API and the GLSL that may be used to allocate space for a buffer object, create a texture buffer object specifying an internal format for a texture, and write data to, and access data from, the buffer object referenced by a texture buffer object.

The method 400 begins at step 405, where an API call is used to create a buffer object with a specified ID and bind it to a buffer object binding point for further manipulation. For example, the OpenGL API includes a call with the following signature:

void BindBuffer(enum target,uint buffer);

The <target> parameter is the name of a buffer object binding point. In one embodiment, in addition to conventional binding points, a new binding point is provided to bind to a texture buffer object. For example, a token such as TEXTURE_BUFFER_EXT may be defined and allowed as a token for the <target> parameter. The <buffer> parameter is an unsigned integer used to identify a buffer object. If <buffer> does not identify an existing buffer object, a new buffer object is created. The API call BindBuffer(TEXTURE_BUFFER_EXT,42);

binds a buffer object numbered 42 to the new TEXTURE_BUFFER_EXT binding point, creating a new object numbered 42 (provided it doesn't already exist).

At step 410, after a buffer object is created and bound to the TEXTURE_BUFFER_EXT binding point, the buffer object may be initialized and loaded with data using an API call. For example, the OpenGL API includes a call with the following signature:

void BufferData(enum target,sizeiptr size,const void*data,enum usage);

This call may be used to initialize the data store 333 for a buffer object with texture image data specified by the <data> parameter. The <size> parameter specifies the size 331 of the buffer object 330. Additionally, the OpenGL API may provide API calls that may be used to load or modify texture image data into a buffer object in a variety of ways, including, for example, direct CPU writes using the MapBuffer( ) API call or using frame buffer read backs (represented in FIG. 2 as arrow 234) as described in the EXT_pixel_buffer_object extension. A buffer object may also be loaded or modified using a transform feedback pathway (represented in FIG. 2 as arrow 233), which captures selected transformed attributes of vertices processed by the one of the processing units of graphic rendering pipeline. Examples of transform feedback are described in a commonly owned co-pending patent application titled: "Feedback and Record of Transformed Vertices in a Graphics Library," filed on Dec. 12, 2006 and having U.S. patent application Ser. No. 11/609,763.

At step 415, an API call may be used to create a buffer texture object and bind it a texture target of an active texture image unit 123. For example, the OpenGL API includes a call with the following signature:

void BindTexture(enum target,uint texture);

Note this API call may be used to initially create a texture object, as well as to bind an existing texture object, depending on the current state of the graphics rendering pipeline and the parameters passed to the BindTexture( . . . ) call. Using the BindTexture( . . . ) call, the texture specified by the <texture> parameter is bound to the texture target identified by the <target> parameter. If the number passed as the <texture> parameter does not correspond to an existing texture object, a new texture object of the type associated with the <target> parameter is created, which will subsequently be identified by the number passed as the <texture> parameter. For example, if the call glBindTexture(TEXTURE_BUFFER_EXT, 17) is executed and no texture object 17 exists, a new buffer texture object numbered 17 is created. That new object will also be bound to the corresponding target of the texture unit at the same time. However, to bind an existing texture object numbered 17, the exact same API call would be used.

In one embodiment, an extension to the OpenGL API allows a developer to specify a token of TEXTURE_BUFFER_EXT target for a call to BindTexture( ) in which case, a texture buffer object is bound to the value supplied as the <texture> parameter. For other texture targets, e.g., one-, two-, three-dimensional textures, and cube maps, existing targets of TEXTURE_1D, TEXTURE_2D, TEXTURE_3D, TEXTURE_CUBE_MAP, may be used. Once created, a texture buffer object remains available until expressly deleted. For example, OpenGL provides an API call with the following signature to free a buffer object:

void DeleteTextures(sizei n,uint*textures);

In this API call, the <textures> parameter is an array of texture object identifiers, and <n> is the number of identifiers in the array. Each of the texture objects corresponding to an identifier in the array is deleted. For example, to delete the texture buffer object #17, the following source code could be used:

uint textures[1];
    textures[0]=17; // fill the array
    DeleteTextures(1, textures);

At step 420, the internal format for the texture buffer object and the association between the buffer object and the texture buffer object bound to a texture image unit may be specified using an API call. For example, in one embodiment, the OpenGL API may be extended to include an API call with a signature like the following:

void TexBufferEXT(enum target,enum internalformat,
        uint buffer);

This call binds the buffer object with a buffer object ID 322 matching the <buffer> parameter to an active texture buffer object and specifies an internal format 320 for the data found in the buffer object using the <internalformat> parameter. If the <buffer> parameter is zero, then any buffer object attached to the active buffer texture object is detached, and no new buffer object is attached. If the <buffer> parameter is non-zero, but is not the name of an existing buffer object, then the error INVALID OPERATION is generated. The <target> parameter is set to TEXTURE_BUFFER_EXT. The <internalformat> parameter specifies the storage format to use in interpreting data in the buffer object referenced by a texture buffer object. Table 1 lists a set of examples of internal formats that may be specified for a texture buffer object using the OpenGL API.

TABLE 1

Internal formats for Texture Buffer Objects

| Sized Internal Format | Base Type | Components | Norm | 0 | 1 | 2 | 3 |
|---|---|---|---|---|---|---|---|
| ALPHA8 | ubyte | 1 | Y | A | . | . | . |
| ALPHA16 | ushort | 1 | Y | A | . | . | . |
| ALPHA16F_ARB | half | 1 | N | A | . | . | . |
| ALPHA32F_ARB | float | 1 | N | A | . | . | . |
| ALPHA8I_EXT | byte | 1 | N | A | . | . | . |
| ALPHA16I_EXT | short | 1 | N | A | . | . | . |
| ALPHA32I_EXT | int | 1 | N | A | . | . | . |
| ALPHA8UI_EXT | ubyte | 1 | N | A | . | . | . |
| ALPHA16UI_EXT | ushort | 1 | N | A | . | . | . |
| ALPHA32UI_EXT | uint | 1 | N | A | . | . | . |
| LUMINANCE8 | ubyte | 1 | Y | L | . | . | . |
| LUMINANCE16 | ushort | 1 | Y | L | . | . | . |
| LUMINANCE16F_ARB | half | 1 | N | L | . | . | . |
| LUMINANCE32F_ARB | float | 1 | N | L | . | . | . |
| LUMINANCE8I_EXT | byte | 1 | N | L | . | . | . |
| LUMINANCE16I_EXT | short | 1 | N | L | . | . | . |
| LUMINANCE32I_EXT | int | 1 | N | L | . | . | . |
| LUMINANCE8UI_EXT | ubyte | 1 | N | L | . | . | . |
| LUMINANCE16UI_EXT | ushort | 1 | N | L | . | . | . |
| LUMINANCE32UI_EXT | uint | 1 | N | L | . | . | . |
| LUMINANCE8_ALPHA8 | ubyte | 2 | Y | L | A | . | . |
| LUMINANCE16_ALPHA16 | ushort | 2 | Y | L | A | . | . |
| LUMINANCE_ALPHA16F_ARB | half | 2 | N | L | A | . | . |
| LUMINANCE_ALPHA32F_ARB | float | 2 | N | L | A | . | . |
| LUMINANCE_ALPHA8I_EXT | byte | 2 | N | L | A | . | . |
| LUMINANCE_ALPHA16I_EXT | short | 2 | N | L | A | . | . |
| LUMINANCE_ALPHA32I_EXT | int | 2 | N | L | A | . | . |
| LUMINANCE_ALPHA8UI_EXT | ubyte | 2 | N | L | A | . | . |
| LUMINANCE_ALPHA16UI_EXT | ushort | 2 | N | L | A | . | . |
| LUMINANCE_ALPHA32UI_EXT | uint | 2 | N | L | A | . | . |
| INTENSITY8 | ubyte | 1 | Y | I | . | . | . |
| INTENSITY16 | ushort | 1 | Y | I | . | . | . |
| INTENSITY16F_ARB | half | 1 | N | I | . | . | . |
| INTENSITY32F_ARB | float | 1 | N | I | . | . | . |
| INTENSITY8I_EXT | byte | 1 | N | I | . | . | . |
| INTENSITY16I_EXT | short | 1 | N | A | . | . | . |
| INTENSITY32I_EXT | int | 1 | N | A | . | . | . |
| INTENSITY8UI_EXT | ubyte | 1 | N | A | . | . | . |
| INTENSITY16UI_EXT | ushort | 1 | N | A | . | . | . |
| INTENSITY32UI_EXT | uint | 1 | N | A | . | . | . |
| RGBA8 | ubyte | 4 | Y | R | G | B | A |
| RGBA16 | ushort | 4 | Y | R | G | B | A |
| RGBA16F_ARB | half | 4 | N | R | G | B | A |
| RGBA32F_ARB | float | 4 | N | R | G | B | A |
| RGBA8I_EXT | byte | 4 | N | R | G | B | A |
| RGBA16I_EXT | short | 4 | N | R | G | B | A |
| RGBA32I_EXT | int | 4 | N | R | G | B | A |
| RGBA8UI_EXT | ubyte | 4 | N | R | G | B | A |
| RGBA16UI_EXT | ushort | 4 | N | R | G | B | A |
| RGBA32UI_EXT | uint | 4 | N | R | G | B | A |

As described above, when a buffer object is attached to a texture buffer object, the buffer object's data store is interpreted as a 1D texel array having one of the above formats. The number of texels in the texel array may be determined by:

floor(<buffer_size>/(<components>*sizeof(<base_
        type>)), where <buffer_size> is the size of the buffer object, in basic machine units, and <components> and <base_type> are the element count and base data type for elements, as specified in Table 1. The number of texels in the texel array is then clamped to the implementation-dependent limit MAX_TEXTURE_BUFFER_SIZE_EXT. When a texture buffer object is accessed by a shader, the results of a texel fetch are undefined if the specified texel number is greater than or equal to the number of texels in the texel array.

At step 425, the texture buffer object may be bound to the texture buffer target of a texture image unit, e.g. texture buffer target 308 of FIG. 3. The BindTexture( . . . ) API call described above may be used. At step 430, a shader program may be bound to one of the graphics processing engines of the graphics rendering pipeline. At step 435, rendering operations may be performed that include reading and/or writing the texture buffer object bound to texture image unit at step 425. Thus, as described, references to the texture buffer object are mapped to the buffer object referenced by the texture buffer object. And the data store of the buffer object is interpreted as being a 1D array of texels having the internal format of the texture buffer object.

The rendering operations performed at step 435 may include shader program accesses to texture buffer objects. To access a texture buffer object using a shader program, the shader program may use an API call. For example, the OpenGL Shading Language includes a built-in function with the following with the following signature:

```
vec4 texelFetchBuffer(samplerBuffer sampler, int
    coord);
```

The <sampler> parameter specifies a texture buffer object sampler variable that holds the number of a texture image unit, and the <coord> parameter specifies which element of the texture buffer object referenced by that texture image unit to access. For example, if invoked as "texelFetchBuffer(sampler,11)" with the value of the uniform <sampler> set to zero, then the texel numbered 11 in the buffer texture object bound to texture image unit #0 is accessed and returned. When a shader program includes a call to the texelFetchBufferEXT API call, the GPU driver 119 may be configured to generate an assembly level instruction executed by GPU 120. For example, the TXF instruction described above may used. If no buffer object is bound to the particular texture image unit specified by the <target> parameter, then the results of the texelFetchBufferEXT are undefined. Otherwise, the data element specified by the <coord> parameter of the appropriate buffer object is accessed and interpreted as a texel having the internal format of the texture buffer object, and may be returned as a four-component vector or in some other form.

In sum, embodiments of the invention provide indexed access to texture buffer objects using a graphics library. In particular, the functionality of API calls used to bind a texture map to a texture image unit may be extended to also allow a texture image unit to reference a texture buffer object. The texture buffer object is itself a reference to a buffer object in the local memory of a graphics hardware device. The texture buffer object specifies a texture format to use in interpreting the data in the buffer object. API calls used to access a texture may be extended to also access the buffer object referenced by a texture buffer object.

Advantageously, once a texture buffer object is bound as the target of a texture image unit, shader programs may read and/or write to the buffer object referenced by the texture buffer object, without having to rebind that texture buffer object each time different shader program is loaded. Further, because the texture image units maintain state as different shader programs are bound and unbound to the processing units of a graphics rendering pipeline, rendering operations may proceed without having to set a new active texture buffer object target for a texture image unit each time a different texture buffer object is desired for rendering operations.

While the foregoing is directed to embodiments of the present invention, other and further embodiments of the invention may be devised without departing from the basic scope thereof, and the scope thereof is determined by the claims that follow.

In one embodiment of the invention, a computer-readable medium includes a set of instructions that when executed by a processing unit causes the processing unit to generate a texture buffer object configured for storing and manipulating texture data for graphics processing operations, by performing the steps of creating a buffer object configured to store the texture data, binding the buffer object to a texture buffer object, binding the texture buffer object to one of a plurality of texture targets included within a texture image unit, and binding a shader program to a processing unit within a graphics rendering pipeline.

We claim:

1. A method for generating a texture buffer object configured for storing and manipulating texture data for graphics processing operations, the method comprising:
    creating a buffer object configured to store the texture data;
    binding the buffer object to a texture buffer object, wherein the texture buffer object includes an internal format that specifies how to interpret the texture data stored in the buffer object as a texture map;
    binding the texture buffer object to one of a plurality of texture targets included within a texture image unit, wherein each texture target included in the plurality of texture targets references a different type of texture map; and
    binding a shader program to a processing unit within a graphics rendering pipeline.

2. The method of claim 1, wherein the texture buffer object includes a buffer object identifier that points to the buffer object.

3. The method of claim 1, wherein the texture buffer object is bound to a texture buffer texture target included within the texture image unit.

4. The method of claim 3, wherein the binding between the texture buffer texture target and the texture buffer object is stateful such that a plurality of shader programs including the shader program access the texture data via the texture buffer texture target.

5. The method of claim 4, further comprising the step of writing the texture data to the buffer object without modifying the binding between the texture buffer texture target and the texture buffer object.

6. The method of claim 5, further comprising the step of modifying the texture data in the buffer object without modifying the binding between the texture buffer texture target and the texture buffer object.

7. The method of claim 3, wherein the texture data in a buffer object is written using data output from a processing unit within the graphics rendering pipeline.

8. A non-transitory computer-readable medium that includes a set of instructions that when executed by a processing unit causes the processing unit to generate a texture buffer object configured for storing and manipulating texture data for graphics processing operations, by performing the steps of:
    creating a buffer object configured to store the texture data;
    binding the buffer object to a texture buffer object, wherein the texture buffer object includes an internal format that specifies how to interpret the texture data stored in the buffer object as a texture map;
    binding the texture buffer object to one of a plurality of texture targets included within a texture image unit, wherein each texture target included in the plurality of texture targets references a different type of texture map; and binding a shader program to a processing unit within a graphics rendering pipeline.

9. The computer-readable medium of claim 8, wherein the texture buffer object is bound to a texture buffer texture target included within the texture image unit, and the binding between the texture buffer texture target and the texture buffer object is stateful such that a plurality of shader programs including the shader program access the texture data via the texture buffer texture target.

10. The computer-readable medium of claim 9, further comprising the step of writing the texture data to the buffer object without modifying the binding between the texture buffer texture target and the texture buffer object.

11. The computer-readable medium of claim 10, further comprising the step of modifying the texture data in the buffer object without modifying the binding between the texture buffer texture target and the texture buffer object.

12. A computing device configured to generate a texture buffer object for storing and manipulating texture data for graphics processing operations, the computing device comprising:

a processing unit; and a software driver configured to:

create a buffer object configured to store the texture data, bind the buffer object to a texture buffer object, wherein the texture buffer object includes an internal format that specifies how to interpret the texture data stored in the buffer object as a texture map, bind the texture buffer object to one of a plurality of texture targets included within a texture image unit, wherein each texture target included in the plurality of texture targets references a different type of texture map, and bind a shader program to a processing unit within a graphics rendering pipeline.

13. The computing device of claim 12, wherein the texture buffer object is bound to a texture buffer texture target included within the texture image unit.

14. The computing device of claim 13, wherein the texture data in a buffer object is written using data output from a processing unit within the graphics rendering pipeline.

15. The computing device of claim 12, wherein the binding between the texture buffer texture target and the texture buffer object is stateful such that a plurality of shader programs including the shader program access the texture data via the texture buffer texture target.

16. The computing device of claim 15, wherein the software driver is further configured to write the texture data to the buffer object without modifying the binding between the texture buffer texture target and the texture buffer object.

17. The computing device of claim 16, wherein the software driver is further configured to modify the texture data in the buffer object without modifying the binding between the texture buffer texture target and the texture buffer object.

* * * * *